OR 3,963,308

/ 5070 C
United States Patent [19] X 3065C

Lebduska

[11] 3,963,308

[45] June 15, 1976

[54] FOCUSING COUPLING DEVICE FOR MULTI OPTICAL-FIBER CABLE

[75] Inventor: Robert L. Lebduska, La Mesa, Calif.

[73] Assignee: The United States of America as represented by the Secretary of the Navy, Washington, D.C.

[22] Filed: June 25, 1973

[21] Appl. No.: 373,583

[52] U.S. Cl. .......... 350/96 C; 350/96 B

[51] Int. Cl.² .......... G02B 5/16

[58] Field of Search .......... 350/96 B, 96 C

[56] References Cited

UNITED STATES PATENTS

| | | | |
|---|---|---|---|
| 2,992,587 | 7/1961 | Hicks et al. | 350/96 B |
| 3,455,625 | 7/1969 | Brumley et al. | 350/96 C |
| 3,508,807 | 4/1970 | Mayer | 350/96 B X |
| 3,770,342 | 11/1973 | Dudragne | 350/96 B X |

OTHER PUBLICATIONS

Parfitt et al., Article in *Electronic Components*, Jan. 28, 1972, pp. 69 and 73–75.

*Primary Examiner*—David H. Rubin
*Attorney, Agent, or Firm*—R. S. Sciascia; G. J. Rubens

[57] ABSTRACT

A coupling device is provided for a multi optical-fiber cable in which the bared free ends of the individual fibers to be coupled or terminated are geometrically oriented in a substantially focusing relation to each other to enable the propagated light beam patterns being transmitted through each fiber end to be concentrated by being superimposed substantially at a common focal plane thereby enhancing the intensity of light being available for transmission across the coupling.

2 Claims, 6 Drawing Figures

X 3065 C

21

FOCUSING COUPLING DEVICE FOR MULTI OPTICAL-FIBER CABLE

BACKGROUND OF THE INVENTION

This invention relates to multi optical-fiber cables, and more particularly to a means and a method for optically coupling such cables to improve the efficiency of light propagation across said coupling.

The transmission of radiant energy along a plurality of fine optic fibers in a composite cable, sometimes referred to as "lightpipes", is becoming increasingly important. Employment of such cables in communication systems and the like have had limited suitability because of problems in manufacture, fragility in handling and installation, and particularly the lack of efficiency in coupling due to high transmission losses across junctions.

There has been a tendency in the art to connect the ends of optical cables in a similar manner as electrical cables. For example, in a splice connection, the bared ends of the light-conducting fibers of each cable are inserted and secured in a connector body half and the two halves secured together by a threaded sleeve or the like, such as shown in U.S. Pat. 3,455,625. This patent also teaches the use of an index matching material positioned between the bared ends of the fiber optic cable ends to provide a continuous optical transmission path between the cable ends. In other coupling devices the cable ends may be adhesively secured together with the connector half such as shown in U.S. Pat. 3,457,000.

The problem in using electrical-type connectors for coupling incoherent light-transmitting fibers is that in the former there was no need individually to align the axes of the ends of the conductors in one cable to the conductor ends in the other cable. However, in optic fiber cables, it has been found that very slight off-axis misalignments between potentially mating fibers being coupled will materially reduce the light propagated across the fiber-to-fiber junction. It can be shown from purely geometrical considerations that a 50% misalignment of the fiber ends will provide as little as 30% of the ideal transmission level. As with antenna propagation, angular deviations from the fiber axial direction will cause the received light to reduce as the square of its effective propagation gain level. A slight improvement in light transmission can sometimes be achieved by rotating one of the multi-fiber cables axially with respect to the other until the maximum transmission is achieved by observing measurements, but this effort is time consuming, and requires special tools and equipment difficult to implement in remote field installations. Furthermore, the improvement in light efficiency is not substantially significant.

SUMMARY OF THE INVENTION

The prior art reliance on fiber-to-fiber alignment for coupling optical fibers has resulted in relatively poor junctions so far as the efficiency of light transmission, especially since these types of cables may exhibit high fiber breakage levels.

It has been discovered that the level of light transmissions across a fiber bundle junction can be greatly enhanced by optical alignment of the fiber ends, that is, by focusing the fiber ends, as well as the emitting light beam patterns therefrom, on a substantially common focal plane where the light beams are superimposed on each other to provide a concentration of light intensity available for further propagation.

This focusing effect has been achieved in the present invention by creating a so-called "funnel" shaped coupling. That is, the coupling device is formed with a tapered core portion to enable the free bared fiber ends in each cable when inserted into the coupling device to be all bent or deflected radially toward the longitudinal axis of the composite cable, preferably at a predetermined angular relationship therewith. All of the light beams emitting from the fiber ends when projected in a focusing relation at a transverse plane passing through the focus point of the centerlines of said fibers are superimposed on each other in overlapping relation to provide a concentrated spot or area of much higher intensity light.

This concentrated light output can be utilized by the coupling device as a terminal for interfacing devices, i.e., photo detectors, as well as for splicing or interconnecting a plurality of such multi-fiber cables.

When adjoining fiber optical cables are spliced or connected together, the funnel-shaped coupling body can be constructed double ended having an hourglass configuration. The bared free ends of the fibers of each cable when inserted in the respective ends of the coupling device are deflected by contact with the walls of the funnel portions into focusing relation with each other.

In some applications, such as for coupling larger sized multi-fiber cables, it may be desirable to utilize additional means in conjunction with the funnel portion to deflect the fiber ends into the optical focusing arrangement. A suitably shaped mandrel can be positioned along the longitudinal axis of the respective cable and longitudinally moved during assembly of the junction to compress the fiber ends against the funnel portion thus ensuring that the longitudinal axis of the fiber ends will coincide at the desired common focal point.

In other words, the invention provides for the geometric optical alignment of random fibers in optic cables, rather than the fiber-to-fiber parallel alignment required in prior art coupling devices. Tests have indicated that this novel coupling has improved light propagation across fiber optic couplings in the order of at least three-fold compared to the prior art couplings.

OBJECTS OF THE INVENTION

A principal purpose of this invention is to improve the efficiency of light transmission across a fiber optic cable junction thereby achieving a "low-loss" junction.

Another important object is to obtain such a junction by optically aligning the fiber optic ends, and a corollary object to achieve such optical alignment by geometrically focusing the light beams emitted from the fiber ends to a common focal point to enhance light intensity available for distribution at the junction.

Still another object is to achieve optical alignment of a plurality of fiber ends in a simple and expedient manner without the necessity for special tooling.

Other objects, advantages and novel features of the invention will become apparent from the following detailed description of the invention when considered in conjunction with the accompanying drawings.

DESCRIPTION OF THE PREFERRED EMBODIMENT

Figure 1:
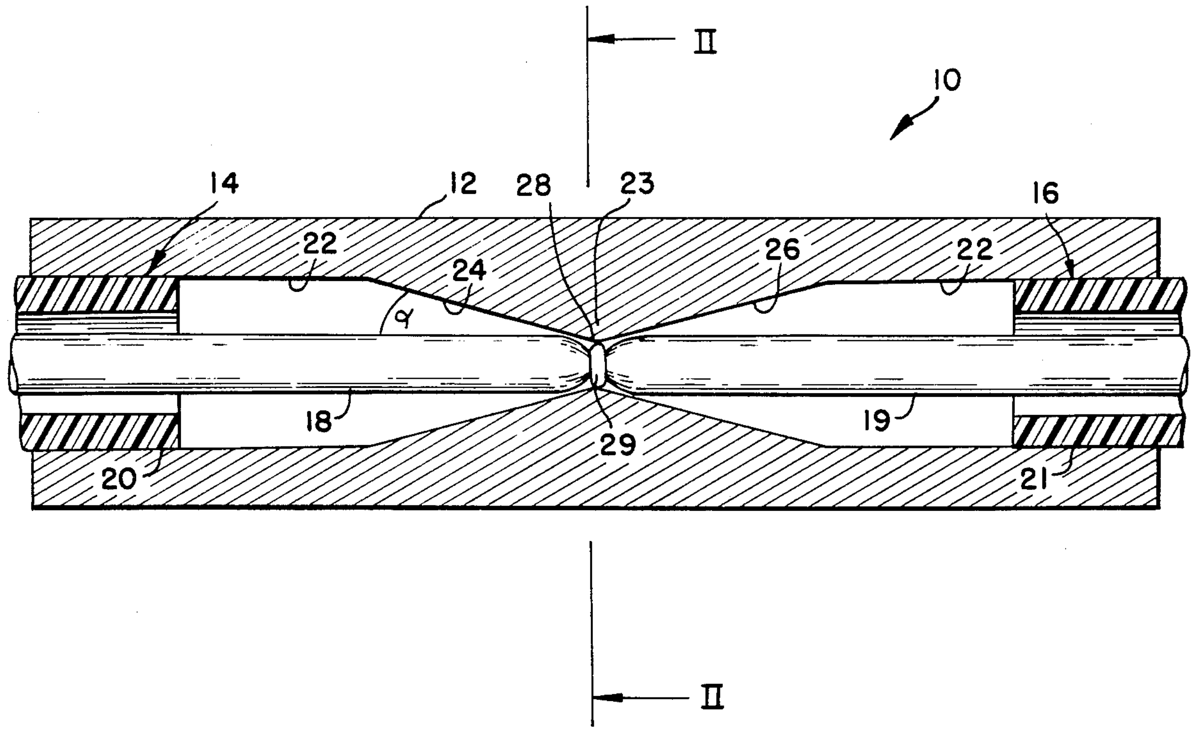
FIG. 1 is a longitudinal cross-section view of a typical fiber optic cable splice coupling utilizing the low-loss focusing concept according to the teaching of this invention.

Referring to the drawing where like reference numerals refer to similar parts throughout the figures, there is shown in FIG. 1 a typical low-loss optical cable splice coupling 10, which is illustrative of only one type of coupling in which the novel features of this invention can be utilized.

Figure 5:
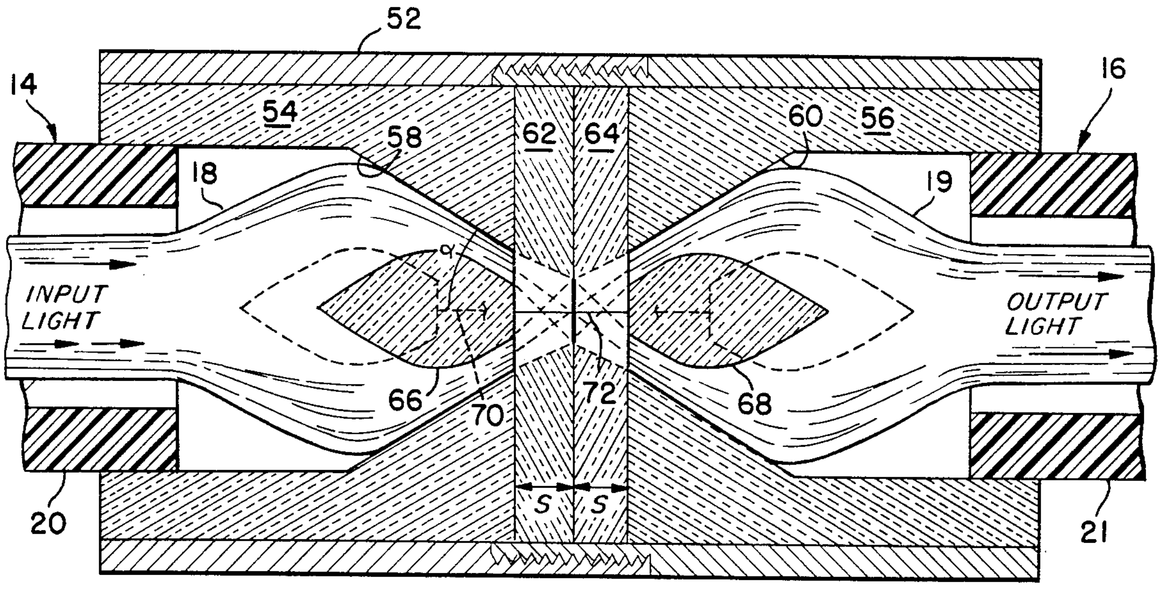
FIG. 5 is an enlarged modified low-loss fiber optic separable coupling in which an axially aligned movable mandrel is provided to assist, in conjunction with the funnel-shaped coupling, in focusing the fiber ends of the respective cables.

The splice coupling includes a connector body 12, made of metal or glass, fabricated in the form of a sleeve adapted to receive at each of its ends a conventional fiber optic cable 14 and 16 to be mated. The connector body can be of integral construction or made separable, as shown in FIG. 5.

Cables 14 and 16 are shown to be of a conventional, single bundle design containing a large number of fine glass core/glass clad fibers 18 and 19, respectively. The fibers of each cable are somewhat loosely packed in a suitable outer protective plastic jacket 20 and 21. One particular type of commercially available cable that has been used in various laboratory tests involving the invention is manufactured by Corning Glass Works, type 5011 and contains about 900 fibers having a 1.8 mil diameter with numerical aperture of about 0.63.

Connector body 12 is constructed with a core opening 22 having end openings to receive the bared ends of the optic fibers 18 and 19, respectively, after a suitable length of the protective jacket has been stripped from the cable. Core opening 22 is formed with an internal constricted central portion 23 formed by oppositely facing conical or tapered walled portions 24 and 26 creating in effect an hourglass configuration. The degree of slope of the tapered wall portions is dependent on factors to be discussed. It is obvious that the tapered wall portions may be integral with the connector body 12 or incorporated in a separate element such as a sleeve shown in FIG. 5.

When the bared free ends of the cables are inserted into connector body the tapered wall portions act to bend the free ends of the respective fibers deflecting them radially inwardly toward the longitudinal axis of the respective cable to obtain optical alignment by a focusing technique in a manner presently to be described. After insertion to the proper position, the deflected free fiber ends are suitably epoxied or otherwise secured in the connector body. Similarly as in the prior art fiber optic separable couplings, the faces of the fiber ends are cut along a common transverse plane, ground and finely polished prior to assembly, which obviously is not possible in the species of FIG. 1 having a unitary connector body.

A space 28 is provided in the constructed central connector portion 23 to be occupied by a conventional index-matching material 29 which may be a liquid, such as cinnemaldehyde ($C_9H_8O$), or a suitable solid material such as a silicone polymer disclosed in previously mentioned Pat. No. 3,455,625. As will be described, the width of space 28 is of a predetermined size being dependent on several variables later to be discussed.

Figure 3:
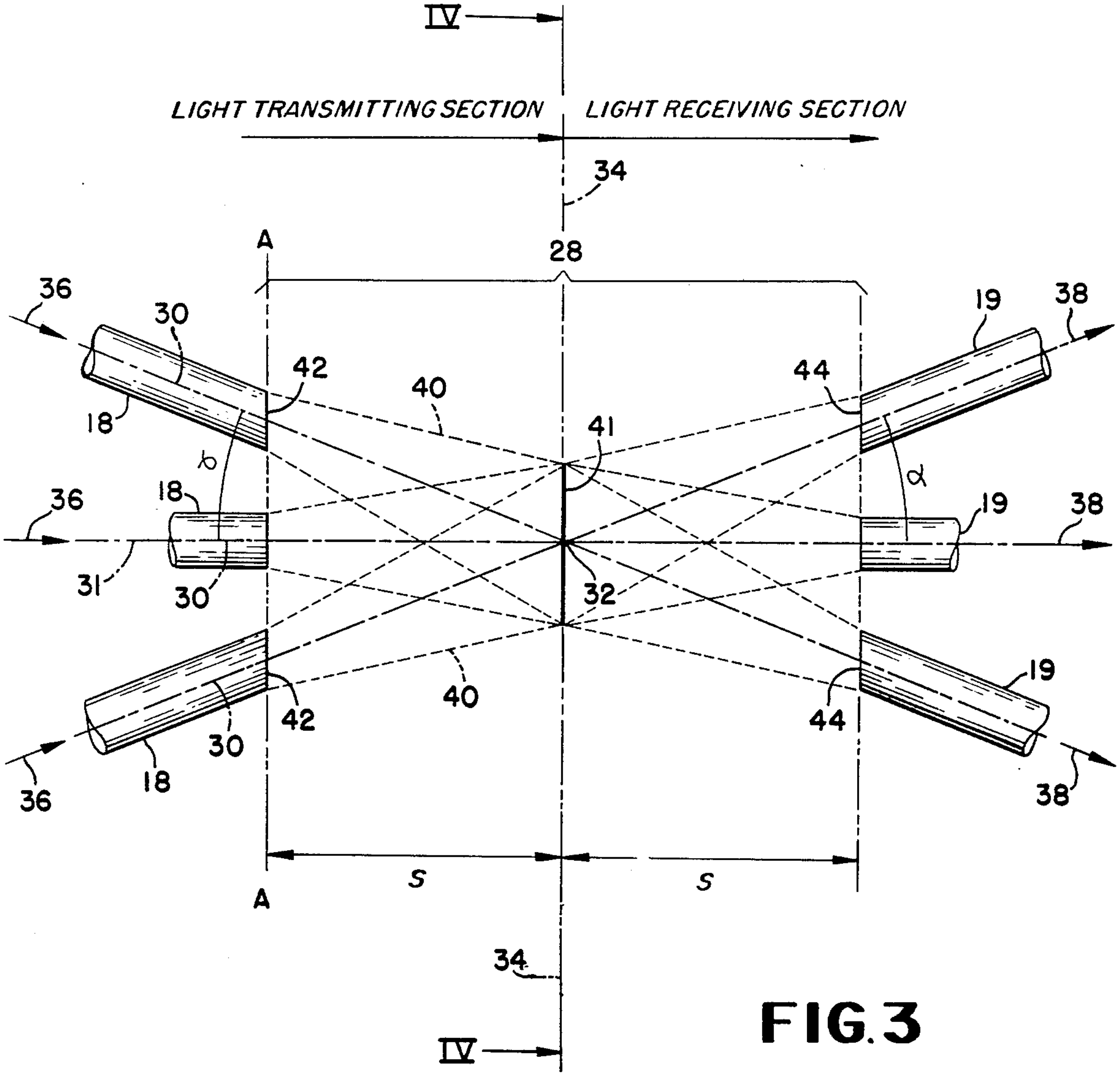
FIG. 3 is an enlarged top diagrammatic view of the fibers in FIG. 2 showing the focused light beams from the ends of the three representative fibers.

The unique light focusing effect achieved by the present invention is best described with reference to FIG. 3. For the sake of clarity of illustration, only three fiber ends of the numerous fibers contained in each cable are shown having been oriented in a focusing relation by the tapered wall portions 24 and 26. Optical alignment of fiber ends 18 of cable 14 with fiber ends 19 of cable 16 is achieved by geometrically focusing as many as possible of the fiber ends so that their centerlines 30 intersect substantially at a focal point 32 through which passes transversely a focal plane 34. It should be noted that the arrangement of fiber ends illustrated in FIG. 3 represents an ideal arrangement, and in practice the arrangement will be on a random basis and obviously the focal point 32 will be a plurality of composite points.

The angular orientation of the fiber ends and their spacing can be determined by the formula:

$$\tan \alpha = (r/s)$$

in which the terms are defined as follows:

- $\alpha$ = the average angular relationship measured between the centerline of each fiber end 30 with respect to the longitudinal centerline 31 of the respective cable (being approximately one-half of the cone angle of funnel 24 and 26)
- $r$ = the average radius of the centerlines of the fiber ends measured at a locus of the fiber ends' faces along transverse line A—A in FIG. 3 (being the radius of the funnel at a plane passing through the fibers' ends)
- $s$ = the distance between the locus of the fiber ends and focal point 32 (being one-half of the indexing space 28 between the locus of the fiber ends of both cables)

As a practical consideration it is usually desirable to maintain a small value of $s$ to minimize the length of the coupling. Also the value of $\alpha$ is in direct proportion to the numerical aperture ($\beta$) of the specific optical fiber employed.

Assuming in FIG. 3 that the radiant energy is being transmitted from cable 14 to cable 16, the light input in fibers 18 is indicated by arrows 36, and the light output from fibers 19 by arrows 38.

The light beams 40 being propagated from the end faces 42 of fibers 18, for a typical low-loss Corning Glass Works cable have numerical apertures or half angles of 10°, designated as angle $\beta$ in FIG. 3, equivalent to a full beam spread of 20°.

Figure 4:
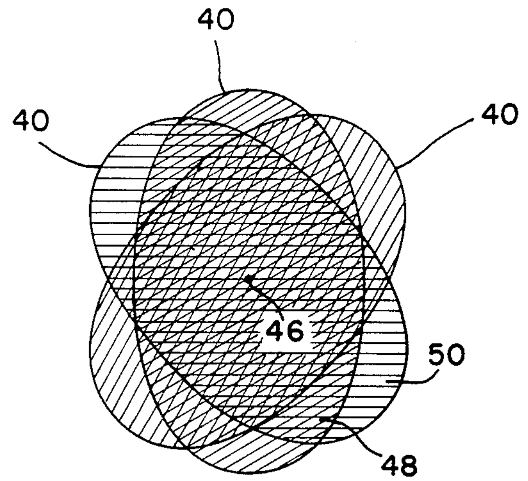
FIG. 4 is a cross-sectional view taken along line IV—IV of FIG. 3 showing the overlapping patterns of the three representative focused light beams as they appear on the focal plane.
Figure 2:
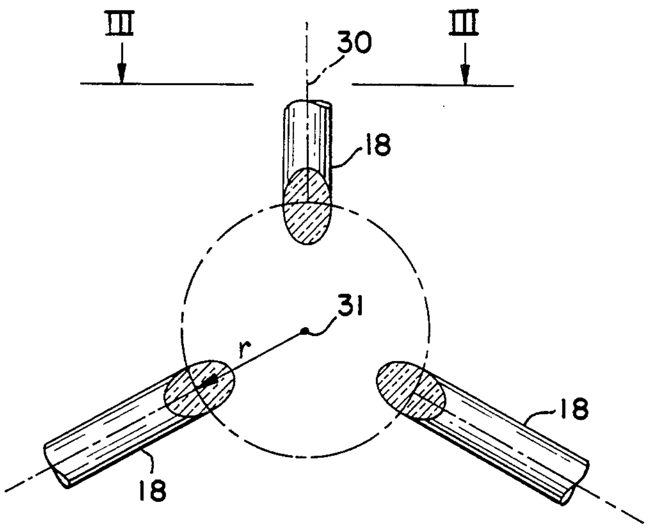
FIG. 2 is a diagrammatic view of the ends of one of the bared fiber optic cables taken along line II—II of FIG. 1, illustrating an arbitrary arrangement of only three spaced representative fibers of the many fibers in each cable, for the purpose of demonstrating the principle of the novel light beam focusing technique.

FIG. 4 shows the overlapping beam patterns 40 which appear at the focal plane 34 and how the light intensity is enhanced. The three illustrative beam patterns 40 in FIGS. 3 and 4 intentionally are not separately indentified because the present invention does not utilize them as individual beams, as in the prior art fiber-to-fiber coupling devices, but, instead merges or superimposes them into a unified beam of the combined intensity at a region 41 at the focal plane 34.

By way of explanation, the cross-sectional area of each of the beam patterns 40 at the region 41 in FIG. 4 has an eliptical configuration as do each of the fiber faces 42 and 44, the latter being cut on a bias with respect to the longitudinal axis of the fibers. The central region 46 of the beams is of triple intensity since all three beams are superimposed in this area; region 48 has a double beam superimposition; and region 50 represents a single beam, where there is no overlapping beam relation.

The eliptical configuration of the cross-sectional area of the beams 40 in FIG. 4 are exaggerated for purpose of illustration and represents a theoretical arrangement. As a practical matter, it is most improbable during the actual mating of the cables that the numerous fiber bared ends when inserted in the funnel portions 24 and 26 will be so uniformly disposed that their centerlines coincide precisely at a common focal point 32. Thus the focal point 32 and the focal plane 34 may be considered as an average of all the focal points and focal planes that may actually exist. Thus, it is likely that a random and uneven superimposition of the beams propagated from the many fiber ends will occur at closely spaced focal planes in which at least a major portion of each will be in some overlapping relation providing an area of light intensity, i.e., a bright spot, which will be some order of the sum of the light intensity of all the beams.

In the splice arrangement of FIGS. 1 and 3, this intensified illumination output at the focal planes is available to be picked up by the similarly, but oppositely disposed, focused fiber faces 44 of fibers 19 of cable 16 to provide a corresponding light output. In this manner, the novel inventive concept provides a coupling having far superior efficiency of light propagation than prior art couplings relying solely on a parallel fiber-to-fiber alignment.

FIG. 5 also shows a splice coupling for fiber optic cables 14 and 15 differing only in that the coupling body 52 is made in two halves to be separable. Also, internal glass or plastic sleeves 54 and 56 may be provided in which the tapered wall portions or funnels 58 and 60 are fabricated. A solid indexing matching material is provided made of suitably polished glass plates 62 and 64, the thickness "S" of each being designed according to above described formula (1).

To ensure a more uniform distribution of the deflected ends of fibers 18 and 19, mandrels 66 and 68 are disposed along the longitudinal axis of the respective cables to act in conjunction with the funneled portions 58 and 60. The mandrels can be made of any suitable solid material or in the form of an inflatable bag which may facilitate insertion in the cable end during assembly of the coupling. As shown, it is preferred that the mandrel have a double-ended tapered configuration to appropriately deflect the free fiber ends into the proper angular relation when compressed against the corresponding tapered wall or funnel portions 58 and 60.

As is illustrated in FIG. 5 lanyards 70 and 72 or any other suitable means may be attached to the mandrels for pulling them into clamping arrangement with the tapered wall portions as the cable ends are being inserted into the coupling during fabrication. The lanyards 70 and 72 can be severed off in the finishing process after the oriented fibers have been epoxied in position.

Figure 6:
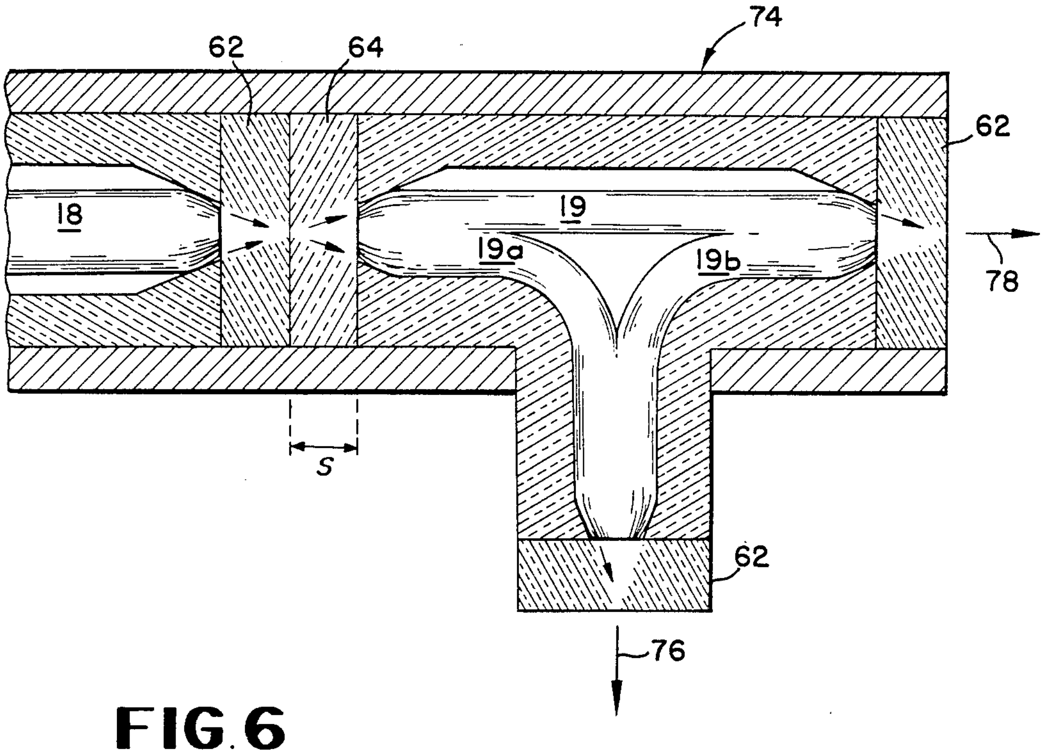
FIG. 6 is a cross-sectional view of a typical low-loss optical "T" coupler incorporating the novel funnel focusing technique.

FIG. 6 is a diagrammatic longitudinal section of a typical low-loss optical T coupler 74 applying the focusing concept of this inventon.

As is apparent, the left hand side of the coupler is essentially the splice connection illustrated in FIG. 1, and described with reference to FIGS. 3 and 5. The right hand side of the coupler is the T connection where a portion of the light output in fibers **19*a* is directed downward as indicated by arrow 76 to interface with another mating connector, detector, monitoring or other equipment, not illustrated. The remaining optic fibers 19 are directed, as indicated by arrow 78, to interface with another mating connector, detector, monitoring or other equipment, not illustrated. The fibers 19*b*** in this particular application are inactive and do not receive or transmit any light.

The novel focusing technique proposed by the instant invention enhances the efficiency of propagation of light across any type of coupling junction, such as a splice connector, or a terminal connector, or any other type of coupling by providing geometrical optical focusing alignment of the terminating fiber ends. Thus, the focusing technique can simply be distinguished from the prior art devices which rely on the fiber ends to be joined in a parallel and individual fiber-to-fiber alignment. As has been described previously, high light propagation losses are experienced through fiber breakage which terminates the transmission in the prior art coupling devices.

By optically focusing the fiber ends to be joined in the prescribed manner, the light output of a majority of the fiber ends are concentrated, by superpositioning of the beams, in a small area of high intensity available for transmission to a terminal device or any other coupling device.

Obviously many modifications and variations of the present invention are possible in the light of the above teachings. It is therefore to be understood that within the scope of the appended claims the invention may be practiced otherwise than as specifically described.

What is claimed is:

1. A coupling device for a fiber optic cable containing a plurality of bared free fiber ends comprising:

a connector body having a longitudinal internal bore extending therethrough providing an opening at both ends to receive said cable;

a tapered mandrel positioned within the bore approximately at the longitudinal axis of the cable and centrally to the fibers;

said internal bore being funnel-shaped for bending the free ends of said fibers and to coact with the mandrel as they are freely inserted within said body at predetermined acute angular relation to the longitudinal axis of the connector body so that the longitudinal centerlines of a substantial number of the fibers when projected will intersect approximately at a common focal point beyond the faces of the fibers' ends and spaced therefrom to enable the light beam patterns emitting from the fiber ends to be substantially superimposed on each other at a transverse plane passing through said common focal point.

2. The coupling device of claim 1 wherein said tapered mandrel has means for pulling the mandrel in a direction to compress the bared fiber ends into engagement with the funnel-shaped bore surface.

* * * * *